April 7, 1970 F. R. QUINN 3,504,849
SNAP ACTING VALVE AND CONTROL MECHANISM THEREFOR.
Original Filed Nov. 25, 1966

INVENTOR.
Frederic R. Quinn
BY
Irving Seidman
ATTORNEY

United States Patent Office 3,504,849
Patented Apr. 7, 1970

3,504,849
SNAP ACTING VALVE AND CONTROL
MECHANISM THEREFOR
Frederic R. Quinn, Red Hook, N.Y., assignor to Zyrotron Industries, Inc., South Hackensack, N.J.
Original application Nov. 25, 1966, Ser. No. 596,954. Divided and this application Sept. 16, 1968, Ser. No. 762,256
Int. Cl. F16k *31/56;* G05d *23/10*
U.S. Cl. 236—48                                2 Claims

ABSTRACT OF THE DISCLOSURE

The combination of a valve for regulating the flow of a fluid and a control mechanism therefor wherein said valve includes a valve body having an inlet chamber including the stem portion and an outlet chamber. The passage communicates with the inlet and outlet chambers. A valve member is provided which has a plug mounted for reciprocating movement in the valve body between the valve closed position in which the plug closes the passage and the valve open position in which the plug opens the passage. The valve member includes a circular portion having a resilient and flexible web connecting the plug with the circular portion. The web has a central planar position which is adapted to be flexed between a position in which the web is inclined upwardly and inwardly above the central position corresponding to the valve open position and a position in which the web is inclined downwardly and inwardly below said central position corresponding to the valve closed position. Accordingly, when the valve member is moved so that the web passes the central position its force characteristic is such as to quickly move the valve plug to the valve open or the valve closed position.

---

Figure 1:
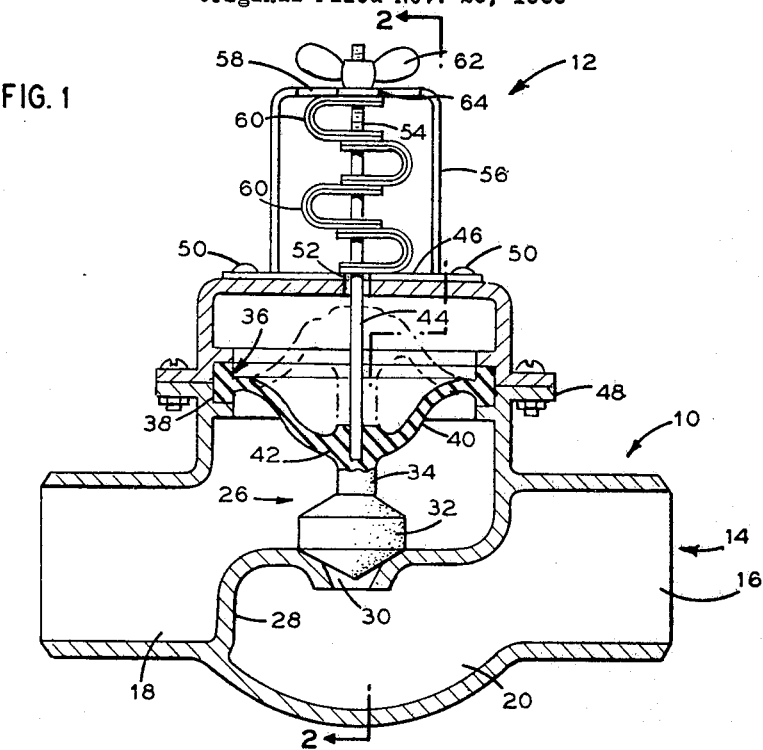

Another feature of the present invention includes a control means for moving the valve member between the valve open and the valve closed position.

This application is divisional of patent application Ser. No. 596,954 filed Nov. 25, 1966 entitled Snap-Acting Valve and Control Mechanism Therefor and assigned to the assignees of the present application.

This invention relates to improvements in Snap-Acting Valves so that the type which are movable quickly between open and closed positions to regulate the flow of the fluid through the valve, and to control mechanisms for rapidly operating the valve between its open and closed positions.

Snap-Acting Valves of the type under consideration usually comprise a valve body having a fluid inlet chamber and a fluid outlet chamber separated by a partition having the fluid opening therein. The opening is selectively closed by a resilient valve member which normally rests on the fluid opening under the influence of a biasing force produced by a resilient diaphragm. An appropriate valve actuating member is provided for operating the valve member to a valve open position to permit the flow of the fluid through the valve. For example, a valve similar in construction to the valve structure described and illustrated in my Patent No. 3,107,894, issued Oct. 22, 1963. Valves of the above-described type have been found extremely useful as an on-off control for fluid flow in sinks, dishwashers, toilets and the like because of the snap-acting operation which accelerates the valve action. However, these valves normally remain in a closed state and are moved to the open state by complex mechanical arrangements which are both costly and are subject to defective operation.

Accordingly, an object of the present invention is to provide a snap-acting valve construction in which the valve may selectively reside in either normally open or normally closed state without the need for maintaining the valve in one of the states by an external force.

A further object of the present invention is to provide a control mechanism for a valve structure which is inexpensive to produce. Another object and feature of the present invention resides in the novel details of construction which provide a control mechanism construction which is characterized by its simple construction and positive operation.

Accordingly, the valve of the present invention includes a valve member which is adapted to seat on an appropriate valve member seat to prevent communication between a valve inlet and a valve outlet chamber. The valve member is further adapted to be moved to a position in which it is spaced from the valve seat by an actuating member to open the valve to provide for the flow of fluid therethrough. In accordance with the present invention, the valve member includes a diaphragm which operates similarly to an over-v-centered toggle linkage so that the valve member will remain either in the seated or the unseated position. Hence, the need for an external force to maintain the valve in either the valve open or the valve closed position is eliminated. To put this another way, once the valve is moved to one of its steady-state positions, no further force is necessary to maintain the valve in that position.

Additionally, as noted hereinabove, the present invention further includes the provision of a control mechanism for quickly moving the snap-acting valve from one position or state to the other in response to the occurrence of a predetermined condition.

Figure 2:
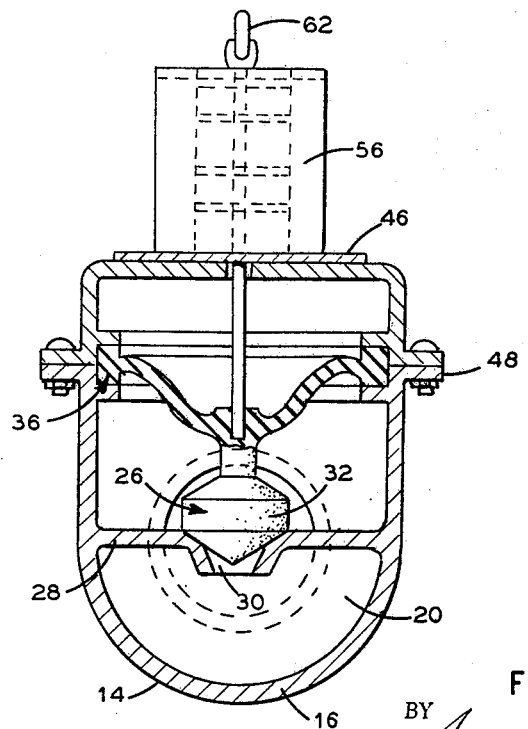

Other objects and advantages of the present invention will become more apparent from a consideration of the following detailed description when taken in conjunction with the accompanying drawings, in which:

FIG. 1 is a front elevational view, with parts broken away, illustrating snap-acting valve mounting the valve control mechanism constructed according to the present invention; and FIG. 2 is a sectional view thereof taken along line 2—2 of FIG. 1.

Referring to the drawings, there is shown in FIG. 1 a snap-acting valve 10 mounting a valve control mechanism, designated generally by the reference numeral 12. The valve 10 comprises a T-shaped valve body 14, the cross-head portion 16 of which defines an inlet fluid chamber 18 and an outlet fluid chamber 20, the respective ends of which are adapted to be connected to suitable conduits (not shown). The stem portion 22 of the valve body 14 is disposed in communication with the inlet fluid chamber portion 18 of the valve body and defines a fluid chamber 24 in which a valve member 26 is reciprocally mounted.

A partition 28 separates the inlet chamber 18 from the outlet chamber 20. Formed in the horizontal wall of the partition 28 is an orifice 30 for connecting the inlet chamber 18 to the outlet chamber 20. The orifice 30 is defined by a frusto-conically shaped wall portion having a convex surface on the inlet side portion thereof and which converges toward the fluid outlet chamber portion 20.

The valve member 26 is preferably formed of a resilient material, such as rubber, neoprene, or the like. The member 26 comprises a conically shaped plug end portion 32, a valve stem 34 connected thereto, and a diaphragm or spring disc 36 connected to the upper end of the valve stem. The diaphragm 36 includes a circular peripheral wall 38 which is adapted to be received in the stem portion 22 of the fluid chamber 24 in fluid tight engagement with the walls thereof. The wall 38 is received in the fluid chamber 24 in spaced relationship to the mouth of the stem portion 22. In other words, the wall 38 is spaced below the top edge of the stem portion 22.

A flexible and resilient web 40 connects the wall 38 with the central valve member section 42 which is connected to the top of the stem portion 34. As shown in the figures, the upper portion of the central section 42 is relatively thick as compared to the relatively thin web 40. Hence the web 40 will flex to a greater degree than will the central section 42.

The web 40 functions as a over-v-center toggle which may reside in an upper position, as shown by the solid line drawing or a lower position, as shown by the phantom line position. The upper and lower positions of the web 40 respectively corresponds to the valve open and valve closed positions of the valve member 26. That is, when the web 40 is in the lower dotted line position wherein the web is inclined downwardly and inwardly, the plug end 32 seals the orifice 30. On the other hand, when the web 40 is in the upper position wherein the web is inclined upwardly and inwardly, the plug end 32 is spaced from the orifice 30 to provide for the flow of the fluid therethrough.

As noted hereinabove, the web 40 is fabricated from a flexible and resilient material so that thet web can move between its upper and lower positions easily. However, the web 40 is provided with a sufficient stiffnes so that it will remain in either its upper or lower position without the necessity of applying an external force to maintain the web in that particular position. Thus, the valve member 26 will remain in either the valve open or the valve closed position until operated to the opposite position by an actuating member or stem 44 which is fixably received in the central section 42. The stem 44 is connected to a suitable control mechanism such as the control mechanism 12.

When it is desired to operate the valve member 26, and assuming that the valve member is in the valve closed position, an upwardly directed force is applied to the stem 44. Thus, the central section 42 will move upwardly thereby causing the web 40 to flex upwardly. As the web 40 passes an imaginary horizontal plane, the web 40 quickly flexes upwardly to quickly move the valve member 26 to the valve open position. When the central section 42 is moved fully to the upper position, the stiffness of the web 40 will maintain the section in such a position, thereby eliminating the need for an external force to maintain the valve member in the valve open position.

When it is desired to close the valve, a downwardly directed force is applied to the central section 42 via the stem 44 to move the central section and the web 40 downwardly. As the web 40 passes through the horizontal plane, the web quickly snaps downwardly so that the plug end 32 seats on the orifice 30. Hence, the web 40 will assume its downwardly inwardly inclined position. The natural stiffnes of the web 40 will maintain the central section 42 in this position so that the external actuating force may be removed without causing the plug end 32 to be unseated from the orifice.

The valve control mechanism 12 is operable to move the valve member 26 to the valve open position. The valve control mechanism is mounted on a supporting plate 46 which in turn, is affixed to a rectangular plate 48, which surrounds the stem portion 22 of the valve body 14, by screws 50. Centrally located in the supporting plate 46 is an aperture 52 which slidingly receives the stem 44 therethrough. As noted above, one end of the stem 44 is imbedded in the valve member 26 so that upward movement of the stem will cause the valve member to move to the valve open position. The upper end of the stem 44 is threaded at 54 for reasons which will become apparent herein below.

An inverted U-shaped bracket 56 is connected to the plate 46 in any conventional manner. Provided in the bight portion of the bracket 56 is an aperture 58 through which the stem 44 extends. A plurality of U-shaped bimetallic strips 60 are received about the stem 44.

More particularly, each bimetallic strip 60 is provided with aligned appertures in its respective legs which slidingly receive the stem 44 therethrough. Morevore, each leg of a bimetallic member rests on the adjacent leg of the juxtaposed strip so that each strip 60 is in alignment with the next adjacent strip.

Threadedly received on the threaded portion 54 of the stem 44 is a wing nut 62 having a radially extending flange 64 at the bottom thereof. The bottom edge of the flange 64 is received in the aperture 58 of the U-shaped member 56 and is positioned to abut the uppermost leg of the top U-shaped strip 60 which is spaced below the bight of the bracket 56.

The control mechanism 12 is a temperature responsive mechanism. Accordingly, when the ambient temperature begins to rise, the legs of each strip 60 begin to move in opposed directions thereby increasing the distance therebetween. Consequently, the distance between the uppermost leg of the top strip 60 and the lowermost leg of the bottom strip will increase. Hence, an upward force will be applied to the stem 44 through the engagement of the strips 60 with the wing nut 62. When the expansion of the strips 60 reaches a preselected level, the valve member 26 will be unseated from the orifice thereby opening the valve. On the other hand, when the ambient temperature is lowered, the strip 60 assume their natural position so that the valve member 26 will assume the valve closed position.

It will be appreciated that the control mechanism 12 shown provides a means for moving the valve to the valve open position at different selected temperatures. This is accomplished by moving the wing nut 62 axially on the stem 44 to change the distance between the bottom edge of the flange 64 and the plate 46. Thus, if the distance is decreased, the bimetal strips 60 need only expand a small distance to move the valve member to the valve open position. Since the expansion of the strips 60 is related to the ambient temperature rise, it will be obvious that the valve will be moved to the valve open position when the temperature rise is relatively small. On the other hand, when the aforementioned distance is increased, the strips 60 will have to move through a greater distance to effect movement of the valve to the valve open position. Hence, the valve will open at a higher temperature than for the aforementioned case.

Accordingly, a valve member has been provided which is movable between a valve open and a valve closed position to regulate the flow of a fluid through the valve wherein the valve may reside in either one of the positions or the other without the application of a biasing force and wherein the valve quickly moves to either the valve open or valve closed position similar to the actuation of an over-v-center toggle arrangement. Additionally, a temperature responsive valve actuating means has been described.

While preferred embodiments of the invention have been shown and described herein it will be obvious that numerous omissions, changes and additions may be made in such embodiment without departing from the spirit and scope of the present invention.

What is claimed is:

1. In combination, a valve for regulating the flow of a fluid and a control therefor, said valve comprising a valve body having an inlet chamber including a stem portion and an outlet chamber, a passage communicating with said inlet and outlet chambers to provide a passage for the flow of the fluid therebetween, said valve member having a plug mounted for reciprocating movement in said valve body betwen a valve closed position in which said plug closes said passage and a valve open position in which said plug opens said passage to permit fluid flow through said valve, said valve member including a circular portion in said stem portion in spaced relationship to the top of said stem portion, and having a resilient and flexible web connecting said plug at the uppper end thereoff with said circular portion, said web being flexible between a position in which said web is inclined upwardly inwardly corresponding to said valve open position in which said web is inclined downwardly inwardly corresponding to said valve closed position, said web being spaced below the top of said stem portion a distance sufficient to permit said web to move to said valve open position, said web having the force characteristic to move said plug between said valve closed and valve open position when said web passes beyond a horizontal plane to provide a quick snapping action to said valve member to accelerate valve action, an actuating member comprising a shaft connected to said valve member; said control including central means mounted on said valve body and connected to said shaft for selectively moving said valve member between said valve open and said valve closed closed position, said control means including an abutment connected to said shaft adjacent to the top thereof, temperature responsive means connected to said shaft and adapted to expand when the ambient temperature rises above a preselected level, said temperature responsive means being positioned to engage said abutment to move said valve member to the valve open position when the temperature rises above said preselected level, said temperature responsive means comprising a plurality of substantially U-shaped bi-metallic strips received on said actuating member between said valve body and said abutment, the leg of each one of said bi-metallic strips being positioned to engage the leg of the next adjacent bi-metallic strip, whereby the uppermost leg engages said abutment to move said valve member to the valve open position.

2. The combination of claim 1, in which said actuating member includes a threaded end portion, said abutment being threadedly engaged with said end portion whereby the distance between said abutment and said valve member may be varied to vary the temperature of operation of said valve.

References Cited
UNITED STATES PATENTS

| | | | |
|---|---|---|---|
| 2,521,891 | 9/1950 | Beams | 251—75 |
| 3,006,507 | 10/1961 | Bauerlein. | |
| 3,067,942 | 12/1962 | Renne | 236—12 |

WILLIAM E. WAYNER, Primary Examiner

U.S. Cl. X.R.

73—363.3; 236—101; 251—75